United States Patent [19]

Fujishiro

[11] 4,399,699

[45] Aug. 23, 1983

[54] ELECTROSTATIC TYPE FUEL MEASURING DEVICE

[75] Inventor: Takeshi Fujishiro, Yokosuka, Japan

[73] Assignee: Nissan Motor Co., Ltd., Yokohama, Japan

[21] Appl. No.: 169,677

[22] Filed: Jul. 17, 1980

[30] Foreign Application Priority Data

Jul. 23, 1979 [JP] Japan .................. 54-100575[U]

[51] Int. Cl.³ .................. G01F 23/26; G08B 21/00
[52] U.S. Cl. .................. 73/304 C; 331/65; 364/550
[58] Field of Search .......... 73/304 C; 364/509, 550; 307/308; 331/65

[56] References Cited

U.S. PATENT DOCUMENTS

| | | | |
|---|---|---|---|
| 2,544,012 | 3/1951 | Edelman | 361/284 X |
| 2,657,579 | 11/1953 | Milsom | 73/304 C |
| 2,805,371 | 9/1957 | Dye | 361/284 |
| 3,010,319 | 11/1961 | Sontheimer | 73/304 C |
| 3,375,716 | 4/1968 | Hersch | 331/65 X |
| 3,376,746 | 4/1968 | Roberts | 73/304 C |
| 3,533,286 | 10/1970 | Westcott et al. | 73/304 C |
| 3,744,314 | 7/1973 | Lenny | 73/304 C |
| 3,747,407 | 7/1973 | Wallman | 331/65 |
| 3,921,451 | 11/1975 | Di Giacomo | 73/304 C |
| 4,091,675 | 5/1978 | Jennison | 73/304 C X |
| 4,107,658 | 8/1978 | Hill et al. | 73/304 C |
| 4,133,453 | 1/1979 | Ohbora | 73/304 C |
| 4,212,202 | 7/1980 | Schmidt | 73/304 C |
| 4,244,385 | 1/1981 | Hotine | 364/509 X |

FOREIGN PATENT DOCUMENTS

| | | | |
|---|---|---|---|
| 2606575 | 8/1977 | Fed. Rep. of Germany | 73/304 C |
| 700466 | 12/1953 | United Kingdom | 361/284 |
| 741298 | 11/1955 | United Kingdom | 361/284 |
| 1219247 | 1/1971 | United Kingdom | 361/284 |
| 1290615 | 9/1972 | United Kingdom | 361/284 |
| 1318512 | 5/1973 | United Kingdom | 361/284 |

OTHER PUBLICATIONS

Elektrische Messung Nichtelektrischer Grossen (3/1962), pp. 260-267, Grave Leipzig 1962 A kademische Verlagsgesellschaft.
Elektrische Messung Nichtelektrischer Grossen 3/1962 pp. 260-267 Dir. H. F. Grave Leipzig 1962 Akademische Verlagsgesellschaft.

Primary Examiner—Daniel M. Yasich
Attorney, Agent, or Firm—Lane, Aitken & Kananen

[57] ABSTRACT

An electrostatic type fuel measuring device comprises a pair of oppositely arranged electrodes separated by insulating spacers immersed in liquid fuel in a tank so that a variation of the electrostatic capacity between the electrodes due to a variation in the liquid fuel level is detected electrically and the fuel amount is measured and indicated.

5 Claims, 8 Drawing Figures

FIG._4B
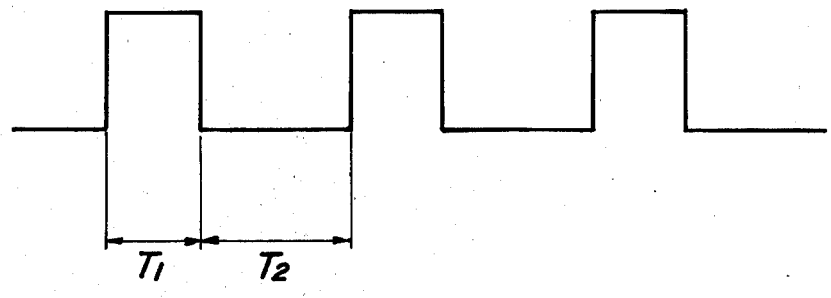
FIG._5
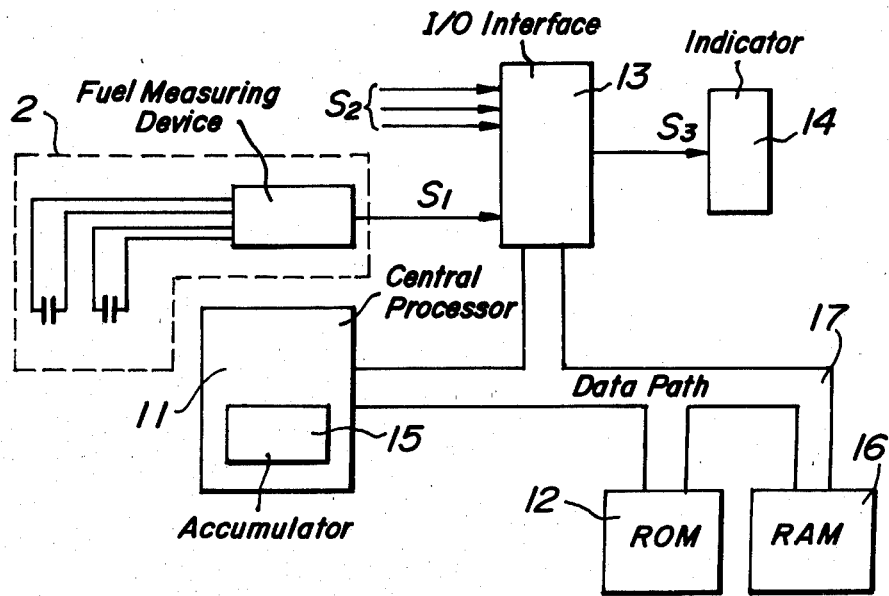

ELECTROSTATIC TYPE FUEL MEASURING DEVICE

BACKGROUND OF THE INVENTION

The present invention relates to a fuel indicator or a fuel measuring device for measuring and for indicating the residual amount of the fuel in a fuel tank of a vehicle.

As a general device for measuring the amount of fuel in a fuel tank of a vehicle, a construction conbining a float and a skiding resistance element is known. In principle, this known device comprises a float floating on the liquid surface of the fuel in a tank. The position of the float representing the amount of the fuel is detected by slidable movement of a sliding element coupled with the float and arranged slidably on a surface of a sliding resistance element to convert the position of the float into an electric amount i.e. an electric resistance. The resistance value is thus measured electrically to derive the amount of fuel in the tank.

In this kind of conventional device, the process to measure the resistance value representing the fuel amount is mechanical as mentioned above. Thus, a variation or change in the contact resistance between the sliding element and the sliding resistance element becomes very large with age. Moreover, such a device has a rather high rate of faults such as imperfect electric contact. In addition, mounting the device in the fuel tank is troublesome.

SUMMARY OF THE INVENTION

The present invention is to improve the aforementioned problems in the conventional device for measuring fuel amount. In the present invention, an electrostatic type fuel indicator or measuring device comprises at least one pair of electrode plates oppositely arranged in the fuel tank. By using the principle of the difference in the dielectric constant of the fuel from the air and the resulting variation of the electrostatic capacity between the electrodes, the fuel amount is accurately measured from the measurement of the said electrostatic capacity.

DESCRIPTION OF THE DRAWINGS

FIGS. 2A and 2B show a modified embodiment of the electrode portion, of which FIG. 2A is a perspective view and FIG. 2B is a cross-section along line B—B in FIG. 2A;

FIG. 4B is an output waveform diagram of the circuit shown in FIG. 4A, and

FIG. 5 is a block diagram of a fuel indication system of the measuring device.

DESCRIPTION OF PREFERRED EMBODIMENT

Figure 1A:
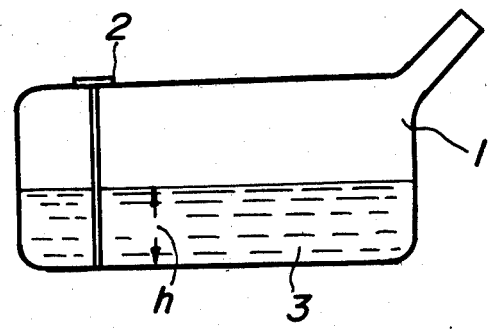
FIG. 1A shows diagrammatically a cross-sectional view of a fuel tank mounted with an electrostatic type fuel measuring device according to the present invention.
Figure 1B:
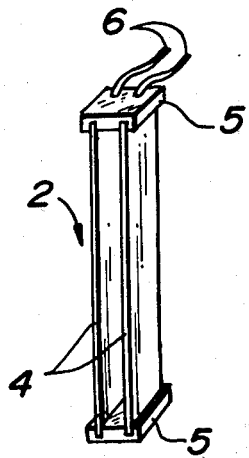
FIG. 1B is an enlarged perspective view of the essential portion of the device.

A first embodiment of the present invention is shown in FIGS. 1A and 1B.

Figure 2A:
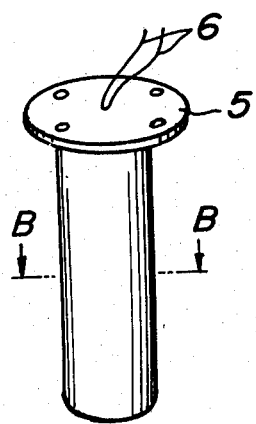
Figure 2B:
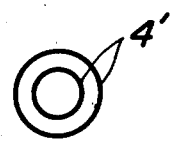

FIG. 1A shows the mounting of a measuring portion of the electrostatic fuel measuring device 2 in a fuel tank 1 containing fuel 3. The fuel measuring device 2 essentially comprises a pair of metal plate electrodes 4 oppositely arranged with a certain separating interval. Both ends of the device 2 are fixedly secured by insulating spacers 5 as can better be seen from FIG. 1B. The electrodes 4 are connected with respective lead wires 6. The oppositely arranged electrodes may alternatively be cylindrical metal plates 4' having different diameters and arranged concentrically to form an interval between the opposed surfaces as shown in FIGS. 2A and 2B. The shape of the electrodes may be altered as desired to obtain various relationships between the fuel amount and the electrostatic capacity.

The principle of measurement by the fuel measuring device having the above construction will be explained hereinafter.

In the case, of parallel electrode plates, the electrostatic capacity C thereof is given by:

$$C = \frac{S \epsilon_0 \epsilon_1}{d}$$

wherein:
S is the surface area of the plate;
$\epsilon_0$ is the dielectric constant in vacuum; and
$\epsilon_1$ is the dielectric constant of the material existing between the electrode.

Accordingly, it we assume that the fuel in the fuel tank 1 has a level of height h from the bottom of the tank as show in FIG. 1 and that the surface area of the electrode plates 4 immersed in the fuel is XS, the electrostatic capacity Cx between the electrodes is given by following $$Cx = \frac{\epsilon_0 S\{(1-X)\epsilon_A + X\epsilon_f\}}{d}$$

wherein:
$\epsilon_A$ is the specific dielectric constant of air; and
$\epsilon_f$ is the specific dielectric constant of fuel.

Based on the above principle, if the amount of fuel varies, the electrostatic capacity between the plate shaped electrodes varies accordingly and by measuring that electrostatic capacity, the amount of fuel can be detected.

As an embodiment of device for measuring the electrostatic capacity, an oscillating system comprising a coil or resistive element is considered. In this case the electrodes of the fuel measuring device 2 are incorporated in the oscillating system. By measuring the variation of the oscillating frequency caused by variation of the electrostatic capacity, the residual amount of the fuel is detected. Various ways for the measurement and indication can be considered.

There is one problem in practice. Namely, the specific dielectric constant of gasoline, which is generally used as the fuel for a vehicle, has temperature characteristics and the dielectric constant of gasoline increases according to temperature rise. Furthermore, the specific dielectric constant $\epsilon$ varies to some extent depending on the composition of hydrocarbons in the gasoline. Also, when alcohol or the like is mixed in the gasoline, the specific dielectric constant $\epsilon$ varies greatly.

Figure 3:
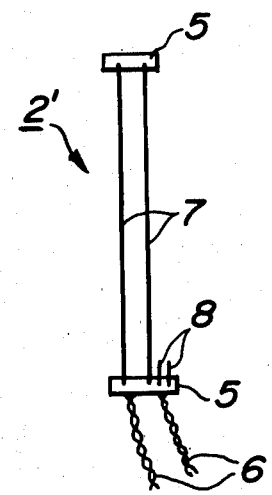
FIG. 3 is further different embodiment of the present invention.

For solving this problem, a device 2' as shown in FIG. 3, includes a pair of reference electrodes 8 for measuring the specific dielectric constant $\epsilon'$ of the fuel itself are provided separately from the main measuring electrode plates 7 for measuring the amount of fuel in the same manner as in the first embodiment. This pair of reference electrodes 8 are formed of small metal plates in a manner that these electrodes are always wholly immersed in the fuel when they are arranged in the fuel tank.

By using this electrostatic type fuel measuring device 2' as shown in FIG. 3, the specific dielectric constant $\epsilon'$ of the fuel itself can be measured by the reference electrodes 8 even if the specific dielectric constant $\epsilon$ of the fuel varies due to temperature variation or variation in fuel composition or the like. By using a relation:

$$\epsilon = \epsilon'/\epsilon_0$$

($\epsilon_0$: specific dielectric constant in vacuum)
the specific dielectric constant $\epsilon$ of the fuel then can be obtained and the influence of the temperature, composition or the like may immediately be compensated and hence the residual amount of the fuel in the tank can be measured very accurately. When a mixture of gasoline and alcohol is used as fuel, the rate of mixture can be detected from the measurement. Thus by arranging to vary the air-fuel ratio according to the detected signal, a substantially optimum control of the air-fuel ratio or that of the advance angle of ignition can be made to match the rate of mixture of the fuel.

An embodiment of the present invention in which the electrostatic fuel measuring device 2' of the above-mentioned second embodiment is incorporated in the control system in order to calculate the average fuel consumption fuel cost, or the possible running distance by the residual amount of the fuel by combining the result with a micro-computer will be explained by referring to FIGS. 4 and 5.

Figure 4A:
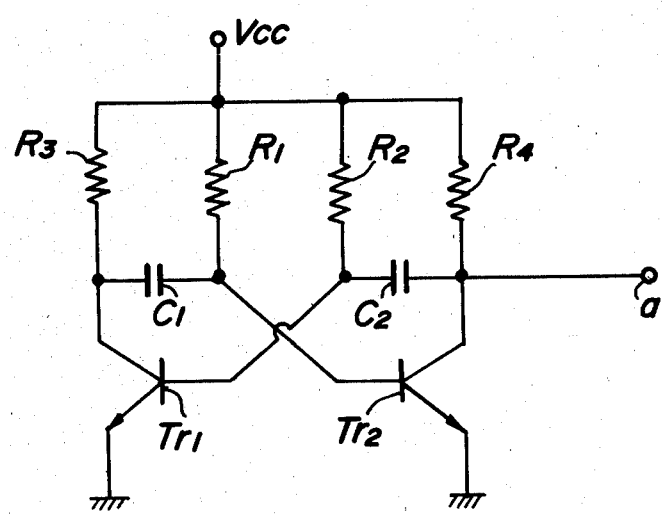
FIG. 4A is a circuit diagram of a non-stable multivibrator used in combination with the measuring portion shown in FIG. 3.

FIG. 4A shows a signal processing circuit used in a stage preceeding the micro-computer. This circuit is basically a non-stable multivibrator and includes the reference electrodes 8 and the measuring electrodes 7 of the fuel measuring device 2' functioning as capacitors $C_1$ and $C_2$, respectively, being and constituting an element for deciding the time constant incorporated with resistors $R_1$ and $R_2$. The circuit further comprises transistors $Tr_1$ and $Tr_2$, and resistors $R_3$ and $R_4$ which are load resistances for the transistors $Tr_1$ and $Tr_2$, respectively.

This type of non-stable multivibrator is generally used as an oscillating circuit for rectangular waves, in which the transistors $Tr_1$ and $Tr_2$ alternately repeat ON and OFF conditions. FIG. 4B shows a waveform of the rectangular wave output signal derived from an output terminal a of the circuit of FIG. 4A. The duration $T_1$ or $T_2$ of the pulse shaped wave is given by the following equations.

$$T_1 \approx 0.7 R_1 C_1$$

$$T_2 \approx 0.7 R_2 C_2$$

Accordingly, the duration $T_1$, $T_2$ or pulse frequency varies according to a variation of the capacity of the reference electrodes 8 and the measuring electrodes 7.

If the signal processing circuit for the signal applied to the input of the micro-computer is formed by such a non-stable multivibrator, the input transmission line to the micro-computer can be decreased to just a single circuit, the number of the circuit elements may be reduced, and hence the reliability can be increased.

FIG. 5 shows a block diagram of a system for calculating average fuel consumption, possible running distance by the residual fuel and the like, based on the output signal derived from the signal processing circuit of FIG. 4.

In this system, the signal $S_1$ derived from the electrostatic type fuel measuring device 2' of the present invention, and signals $S_2$ derived from a vehicle speed sensor, an operation mode changing switch or the like (for switching either to the average fuel consumption or to residual running distance) are read-in by a central processor 11 based on a program stored in a read only memory ROM 12 via an I/O (input/output) interface 13. Based on the above signals, the average fuel consumption or residual running distance may be calculated and the obtained values, as the output $S_3$ of the system, are displayed on an indicator 14 formed of a liquid crystal or phosphorescent indicating tube via the input/output interface 13. In the system, the reference numeral 15 designates an accumulator operating at the transfer or process of the data, numeral 16 is a random access memory (RAM) for temporarily memorizing the intermediate process of calculation and numeral 17 is the data path.

There will be various ways for forming the processing and indicating system so that detailed explanation is omitted.

As has been explained in the foregoing according to the present invention, the construction of the fuel measuring device can be made very simple. Thus, it has advantages for easy mounting in the fuel tank and accordingly a material improvement of the measuring accuracy can be obtained. The shape of the electrodes or the electrode interval may be varied to match the shape of the tank, depending on the various types of the vehicle, to meet the requirement by which the relation between the fuel amount and the electrostatic capacity can be nearly exact. Hence, the same signal processing unit can be used commonly for various types of fuel tanks.

What is claimed is:

1. A method for measuring the amount of liquid fuel in a fuel tank with a device which includes a pair of measuring electrodes arranged relative each other to provide an electrostatic capacity therebetween which is related to the area of the measuring electrodes immersed in the tank and the height of fuel in the tank and thus representative of the amount of fuel in the tank; and at least a pair of spaced reference electrodes mounted in insulating means for maintaining said reference electrodes spaced ralative to said measuring electrodes in the fuel tank so that said reference electrodes are always wholly immersed in the fuel in the fuel tank, said reference electrodes being arranged relative to each other to provide an electrostatic capacity therebetween which is representative of the specific dielectric constant of the fuel, the method comprising the steps of:
sensing the electrostatic capacity between the reference electrodes immersed in the fuel;
sensing the electrostatic capacity between the measuring electrodes as a function of the surface area of the measuring electrodes, the specific dielectric constant of the air above the fuel level and the specific dielectric constant of the fuel; and
providing a pulsed output signal from an astable multivibrator which said signal has a first component representative of the sensed electrostatic capacity of said measuring electrodes and a second component representative of the sensed electrostatic capacity of said reference electrodes, whereby the frequency of the pulsed output signal is respectively determined as a representative of the electrical capacity of both said measuring electrode and said reference electrodes.

2. A method as recited in claim 1, further comprising determining the average rate of fuel consumption from said pulsed output and displaying the determined average rate of fuel consumption.

3. A method as recited in claim 1 further comprising determining from said pulsed output the possible running distance permitted by the fuel remaining in the fuel tank and displaying the determined possible running distance.

4. An electrostatic type fuel measuring device for measuring the amount of liquid fuel in a fuel tank by detecting the level of the liquid fuel, comprising:

at least a pair of spaced measuring electrodes mounted in the fuel tank and insulating means for maintaining said measuring electrodes in a spaced configuration, said measuring electrodes being arranged relative to each other to provide an electrostatic capacity therebetween which is related to the immersed surface area of the electrodes and the height of fuel in the tank, the electrostatic capacity being representative of the amount of fuel in the tank;

at least a pair of spaced reference electrodes mounted in the fuel tank and in insulating means for maintaining said reference electrodes spaced relative to said measuring electrodes and mounted so that said reference electrodes are always wholly immersed in the fuel in the fuel tank, said reference electrodes being arranged relative to each other to provide an electrostatic capacity therebetween which is representative of the specific dielectric constant of the fuel;

signal processing means electrically connected in circuit with said measuring electrodes and said reference electrodes, for providing a pulsed output signal having a frequency representative of the electrical capacity of both said measuring electrodes and said reference electrodes; and detecting means in circuit with said signal processing means for utilizing said output signal to provide an indication of the level of fuel in said tank;

said signal processing means including an astable multivibrator which includes a first resistor and a first capacitor defining a first time constant and a second resistor and second capacitor defining a second time constant, said first capacitor being primarily the capacitance of said reference electrodes and the second capacitor being primarily the capacitance of said measuring electrodes arranged to produce a pulsed output signal which has a first component related to the first time constant and a second component related to said second time constant wherein the pulse frequency varies according to the variation of the capacity of the reference electrodes and said measuring electrodes.

5. An electrostatic type fuel measuring device for measuring the amount of liquid fuel in a fuel tank by detecting the level of the liquid fuel, comprising:

at least a pair of spaced measuring electrodes mounted in the fuel tank and insulating means for maintaining said measuring electrodes in a spaced configuration, said measuring electrodes being arranged relative to each other to provide an electrostatic capacity therebetween which is related to the immersed surface area of the electrodes and the height of fuel in the tank, the electrostatic capacity being representative of the amount of fuel in the tank;

at least a pair of spaced reference electrodes mounted in the fuel tank and in insulating means for maintaining said reference electrodes spaced relative to said measuring electrodes and mounted so that said reference electrodes are always wholly immersed in the fuel in the fuel tank, said reference electrodes being arranged relative to each other to provide an electrostatic capacity therebetween which is representative of the specific dielectric constant of the fuel;

an astable multivibrator which switches between a first state and a second state to generate a pulsed output, said astable multivibrator including the capacitance of said reference electrodes, the capacitance of said measuring electrodes, and means to determine the duration of said first state in accordance with the capacitance of said reference electrodes and the duration of said second state in accordance with the capacitance of said measuring electrodes whereby said pulsed output signal has a first component related to the capacitance of said reference electrodes and a second component related to the capacitance of said measuring electrodes;

detecting means connected in circuit with said astable multivibrator for utilizing said pulsed output to provide an indication of the level of fuel in said tank.

* * * * *